UNITED STATES PATENT OFFICE 2,106,762

CONTROLLED-GRAIN SUGAR

Reed W. Robinson and Andrew Olsen, Jr., San Francisco, Calif.

No Drawing. Application November 27, 1934, Serial No. 755,000

6 Claims. (Cl. 99—134)

This invention relates to sugar for confectioners' use, and the objects of the invention are to produce a sugar having an extremely fine controlled grain which may be used in making confections such as cake icings, fondant, etc.

Briefly described, our invention comprises producing a sugar of extremely fine crystals each separated by a film of colloidal or non-crystallizable material in quantity sufficient to prevent agglutination or building up of the fine crystals into larger units in carrying out our process, yet insufficient to interfere with fine pulverizing of the mass, so as to produce a substantially dry pulverized sugar.

In using our improved sugar product in the making of substantially grainless, smooth tasting confections, a suitable quantity of the improved sugar product is simply melted or softened in a little water with the aid of heat and stirring for a few moments, though without boiling, then poured out in a pan to cool into a smooth unctuous fondant-like mass, or it may be poured over a cake to form an icing. Any desired flavors may be incorporated in the mass before pouring out.

The substances used to isolate the minute crystals of sugar and thereby produce a fine grain, include invert sugar or commercial glucose and corn syrup, also honey, caramel, gum arabic, dextrine, tragacanth, gelatine, etc. These substances may be singly or severally added to cane or beet sugar together with water and cooked to a temperature ranging from about 235° F. to 255° F., then cooled without agitation, preferably in a water-jacketed mixer, to a temperature ranging between 90° F. and 120° F., then stirring and mixing it in the machine until it thickens to a firm mass substantially grainless to the sense of taste, and which will take about fifteen minutes more or less to achieve. This mass is then broken or chopped up to reduce it to about quarter inch pieces, and after a few minutes, especially if spread out, as on a conveyor, it will be found hard and dry enough for pulverizing or grinding. After pulverizing it is passed through a fine sieve and thereafter further dried to drop its free moisture content to about 3% or lower.

The proportions of the ingredients used may vary somewhat, and the temperature of cooking will control the moisture content, but a suitable formula using corn syrup would be:

| | Parts by weight |
|---|---|
| Sugar | 75 |
| Corn syrup about | 8 |
| Water | 16 |

Too much of the corn syrup or invert sugar would prevent the mass being powdered, and too little would not control the grain in the fine condition produced by the treatment.

If the process as above set out is not carried out with great care the sugar will yield a disagreeably crystalline product, or if cooked at too high a temperature the product will be too hard to handle in the agitator, whereas if agitated while too hot the grain will be too coarse.

Instead of directly adding the corn syrup or invert sugar to the sugar and water, the invert sugar may be formed in situ by introducing a suitable acid such as citric, tartaric, or acetic acid, or cream of tartar, to plain sugar and water and cooking until the invert sugar is formed. Also, a fair product may be obtained by prolonged cooking without acid additions. In case of using the gums, gelatine, etc., these may first be dissolved in a little warm water before incorporating with the sugar and water and melting by the application of heat. While honey is useful as the non-crystallizable material, glucose is preferable as it is less hygroscopic.

As a modification of our process, though not yielding so smooth a product, the hot mass after dumping into the agitator is only permitted to cool to a temperature ranging between about 130° to 160° F. and at which point from about 10% to 30% of a previously grained batch is dumped in and the mixer run until the added material is mixed and thoroughly incorporated. The mixing may then be discontinued and the combined batch dumped out, preferably in a layer, to cool spontaneously, and at which time the fine graining will be automatically effected. The pre-grained material which is added to the batch is preferably one with even a finer grain than actually required in the finished product, as it is thought to function in supplying seed crystals upon which the whole structure is built up, and hence the formula of this added material should be one which is over-rich in colloidal matter or its equivalent and cooled to a somewhat lower temperature before stirring.

The mechanics of our process appear to depend on obtaining a thorough division of extremely fine sugar crystals of a size giving no feeling of grit or granularity to the tongue, the crystals being separated by a film of non-crystallizable innoxious film forming substance either produced in the batch of material itself or added in predetermined amounts. This film may consist of any of the film forming substances above mentioned, or similar substances, directly incorporated in the batch or formed therein by heat or reaction in the manner indicated.

A sugar product made in accordance with the disclosure provides for making smooth substantially grainless confections in two or three minutes' time as against a long and difficult process when using ordinary sugar. Almost any desired flavoring material may be incorporated without materially affecting the nature of the powdered product. The fine controlled grain, or rather, substantially grainless nature of our sugar, is a fixed property, which will persist after remelting in the manner described.

Having thus described our improved sugar having a stabilized or controlled fine grain, we claim:—

1. The process of making an extremely fine controlled-grain sugar which comprises cooking sugar and water together with a small proportion of an edible non-crystallizable film forming material adapted to form a film between the sugar crystals, lowering the temperature of the mass, and before appreciable crystallization sets up stirring the same to inhibit coarse granulation thereof, thereafter drying and finely dividing the mass, whereby a product results which consists of a substantially dry loose material adapted to retain its extremely fine substantially grainless characteristic and yield a smooth substantially grainless fondant-type of candy body upon remelting or softening with water and heat and again cooling without a creaming step.

2. The process of making an extremely fine controlled-grain sugar which comprises cooking sugar and water together in presence of a small proportion of an edible non-crystallizable film forming material adapted to form a film between the sugar crystals, lowering the temperature of the mass, mixing into the mass a proportion of a previously produced batch of fine controlled-grained sugar, thereafter drying and finely dividing the product.

3. The process of making an extremely fine controlled-grain sugar which comprises cooking sugar and water together in presence of a small proportion of an edible non-crystallizable film forming material adapted to form a film between the sugar crystals, lowering the temperature of the mass to from about 130° to 160° F., mixing into the mass a proportion of from about 10% to 30% of a previously produced batch of fine controlled-grain sugar, thereafter drying and finely dividing the product.

4. A controlled grain sugar consisting of extremely fine sugar crystals separated from one another by a film of edible non-crystallizable film forming material, all in the form of a stable substantially dry loose material adapted upon simple melting or softening with heat and water and again cooling without creaming to yield a smooth substantially grainless fondant-type of candy body.

5. The process as specified in claim 1, in which said edible non-crystallizable film forming material is formed by reaction within the mass during the cooking of the same.

6. The process as specified in claim 1, in which said edible non-crystallizable film forming material is formed by reaction within the mass during the cooking of the same by the addition of an invert forming substance thereto in place of directly incorporating said material.

REED W. ROBINSON.
ANDREW OLSEN, Jr.